(12) United States Patent
Zeng et al.

(10) Patent No.: US 9,160,207 B2
(45) Date of Patent: Oct. 13, 2015

(54) HIGH POWER BRUSHLESS DC MOTOR AND CONTROL BOX STRUCTURE WITH HEAT DISSIPATION ARRANGEMENT

(71) Applicant: Zhongshan Broad-Ocean Motor Co., Ltd., Zhongshan (CN)

(72) Inventors: Chongsheng Zeng, Zhongshan (CN); Songfa Tang, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 331 days.

(21) Appl. No.: 13/844,984

(22) Filed: Mar. 17, 2013

(65) Prior Publication Data

US 2014/0175914 A1 Jun. 26, 2014

(30) Foreign Application Priority Data

Dec. 25, 2012 (CN) .......................... 2012 1 0571934
Dec. 25, 2012 (CN) ...................... 2012 2 0723809 U

(51) Int. Cl.
*H02K 5/20* (2006.01)
*H02K 5/24* (2006.01)
*H02K 9/06* (2006.01)
*H02K 11/00* (2006.01)

(52) U.S. Cl.
CPC .. *H02K 5/20* (2013.01); *H02K 5/24* (2013.01); *H02K 9/06* (2013.01); *H02K 11/0073* (2013.01)

(58) Field of Classification Search
CPC ............ H02H 5/24; H02H 5/22; H02H 5/225
USPC .......... 310/90, 91, 89, 71, 51, 68 R, 67 R, 52, 310/54, 58, 64, 62, 63; 248/674, 314
See application file for complete search history.

(56) References Cited

U.S. PATENT DOCUMENTS 1,998,087 A * 4/1935 Koch, Jr. .......................... 310/62
3,497,677 A * 2/1970 Blain ............................ 219/523

(Continued)

FOREIGN PATENT DOCUMENTS

AU    1955009590    *    6/1955
CN     201813258     *    4/2011

(Continued)

OTHER PUBLICATIONS

English machine translation for CN 201813258.*

(Continued)

*Primary Examiner* — Dang Le
*Assistant Examiner* — Ahmed Elnakib
(74) *Attorney, Agent, or Firm* — Matthias Scholl P.C.; Matthias Scholl

(57) ABSTRACT

A motor, including: a motor body, the motor body including two ends; a damping ring, the damping ring including a bottom; a mounting bracket; a locking device; a control box; and a connection housing, the connection housing including two ends, and a sidewall. The damping ring is disposed on each end of the motor body. The bottom of the damping ring is supported by the mounting bracket. The damping ring is fixed on the mounting bracket by the locking device. One end of the connection housing is connected to a bottom of the motor body; the other end of the connection housing is connected to a top of the control box. A plurality of heat dissipation holes is arranged on the sidewall of the connection housing.

11 Claims, 11 Drawing Sheets

(56) References Cited

U.S. PATENT DOCUMENTS

| | | | |
|---|---|---|---|
| 2011/0193432 A1* | 8/2011 | Takechi et al. | 310/62 |
| 2011/0285225 A1* | 11/2011 | Matsuda et al. | 310/64 |
| 2011/0291500 A1* | 12/2011 | Tang et al. | 310/64 |
| 2014/0062265 A1* | 3/2014 | Zeng et al. | 310/60 R |
| 2014/0175956 A1* | 6/2014 | Wu et al. | 310/68 R |

FOREIGN PATENT DOCUMENTS

| | | | |
|---|---|---|---|
| CN | 2025242248 | * | 12/2012 |
| DE | EP 1928680 | * | 2/2009 |

* cited by examiner

HIGH POWER BRUSHLESS DC MOTOR AND CONTROL BOX STRUCTURE WITH HEAT DISSIPATION ARRANGEMENT

CROSS-REFERENCE TO RELATED APPLICATIONS

Pursuant to 35 U.S.C. §119 and the Paris Convention Treaty, this application claims the benefit of Chinese Patent Application No. 201210571934.1 filed Dec. 25, 2012, and of Chinese Patent Application No. 201220723809.3 filed Dec. 25, 2012, the contents of which are incorporated herein by reference. Inquiries from the public to applicants or assignees concerning this document or the related applications should be directed to: Matthias Scholl P. C., Attn.: Dr. Matthias Scholl Esq., 14781 Memorial Drive, Suite 1319, Houston, Tex. 77079.

BACKGROUND OF THE INVENTION

1. Field of the Invention

The invention relates to a high-power motor.

2. Description of the Related Art

A typical high-power DC brushless motor used for the installation of a fan includes a motor body, two damping rings, a mounting bracket, a locking device, and a control box. The damping rings are arranged on both ends of the motor body. A bottom of damping ring is embedded in the recess of the mounting bracket. The damping rings are fastened to the mounting bracket by the locking device. The control box is arranged on the end cover of the motor body. Electronic components with high heat productivity are arranged in the control box. As the electronic component dissipates heat only by the control box, the heat dissipation effect is bad which affects the work of the electronic components.

Besides, a typical motor controller includes: a control box, a circuit board, and a power panel. The circuit board and the power panel are arranged in the control box. Electronic components like power modules are arranged on the circuit board and the power panel. In order to make the power modules with high heat productivity dissipate heat quickly, radiators are usually added to dissipate heat. The radiators are arranged on the control box. The structure of the motor controller has the following disadvantages: 1) as the controller has a compact structure, the heat dissipation effect is bad; 2) as radiators are added, the motor controller has disadvantages of a complicated structure, complex and difficult installation procedures, and higher cost; 3) as the volume of the radiator is larger, the motor controller is only suitable for fewer motors.

SUMMARY OF THE INVENTION

In view of the above-described problems, it is one objective of the invention to provide a high-power motor that has a simple structure, good property in heat dissipation, lower cost, and simplified manufacturing procedures.

To achieve the above objective, in accordance with one embodiment of the invention, there is provided a motor, comprising: a motor body, the motor body comprising two ends; a damping ring, the damping ring comprising a bottom; a mounting bracket; a locking device; a control box; and a connection housing, the connection housing comprising two ends, and a sidewall. The damping ring is disposed on each end of the motor body. The bottom of the damping ring is supported by the mounting bracket. The damping ring is fixed on the mounting bracket by the locking device. One end of the connection housing is connected to a bottom of the motor body; and the other end of the connection housing is connected to a top of the control box. A plurality of heat dissipation holes is arranged on the sidewall of the connection housing.

In a class of this embodiment, a plurality of heat dissipation panels is arranged on a top surface of the control box. A step is arranged on an outer edge of each heat dissipation panel. The other end of the connection housing is disposed on the step.

In a class of this embodiment, a plurality of heat dissipation panels is radially arranged. Outer ends of every two adjacent heat dissipation panels form an air inlet. A first air channel is formed between every two adjacent heat dissipation panels.

In a class of this embodiment, the motor body comprises: a shaft, a rotor assembly, a stator assembly, a housing provided with a plurality of ventilation holes, a front end cover, and a rear end cover provided with a plurality of through-holes. The shaft and the rotor assembly are connected together. The rotor assembly is disposed inside the stator assembly. The housing and the stator assembly are connected together. The front end cover and the rear end cover are disposed on two ends of the housing, respectively. The shaft is supported by bearings the front end cover and the rear end cover. A rear part of the shaft stretches into the connection housing. A centrifugal fan blade is positioned inside the connection housing on the rear part of the shaft.

In a class of this embodiment, the connection housing is disposed on a rear cover step arranged on the rear end cover. The damping ring arranged on the rear end cover is positioned inside the connection housing.

In a class of this embodiment, an opening is arranged on a bottom of the control box; the top of the control box is sealed. A plurality of cone-shaped heat dissipation columns is disposed on a middle part of the top surface of the control box inside the heat dissipation panel. The circuit board is disposed inside the control box. A box cover is disposed at the bottom of the control box for covering the opening.

In a class of this embodiment, the connection housing, the control box, and the box cover are connected to the rear end cover through screws.

In a class of this embodiment, two sides of the mounting bracket are convex upward to form two supporting plates, respectively. Each supporting plate is provided with a recess. A bottom of the damping ring is nested in the recess of the mounting bracket.

In a class of this embodiment, a plurality of gaps is arranged at a top of one end of the connection housing. The gaps are imbedded in the support plate.

In a class of this embodiment, the locking device comprises: a left clasp, and a right clasp. Both the two clasps comprise two ends. One end of the left clasp and one end of the right clasp are connected to the supporting plate; and the other end of left clasp and the other end of the right clasp are connected together by a screw bolt and a nut for fastening a top of the damping ring. A locking bracket is disposed between the left clasp and the right clasp. The locking bracket is connected with the left clasp and the right clasp via the screw bolt and nut and is disposed on the top of the damping ring.

In a class of this embodiment, a heat dissipation boss is arranged on the top of the control box. An IPM module is installed on a bottom surface of the circuit board. The IPM module is supported by the heat dissipation boss and is fastened by screws. A convex column is arranged on the top of the control box outside the circuit board. A power panel is arranged inside the control box beneath the circuit panel. The power panel is supported by the convex column, and is in electric connection with the circuit board via a lead terminal In a class of this embodiment, a plurality of cone-shaped heat dissipation columns is arranged on the middle of the top surface of the control box inside the heat dissipation boss.

In a class of this embodiment, a rectifier bridge component and an SCR component are installed on the power panel. The rectifier bridge components and the SCR components are pressed against an inner surface of a sidewall of the control box by a plurality of press plates. The press plates are fastened to the control box by screws.

In a class of this embodiment, a plurality of heat dissipation ribs is arranged outside the rectifier bridge components and the SCR components on an outer surface of the sidewall of the control box. The heat dissipation ribs stretch to the top surface of the control box.

In a class of this embodiment, an outlet hole is arranged outside the power panel and the circuit board on the control box.

In a class of this embodiment, a plurality of ventilation holes is arranged on the sidewall of the control box.

In a class of this embodiment, the top surface of the control box is an arc surface.

Advantages of the invention are summarized as follows:

1) The connection housing is added in the invention; one end of the connection housing is arranged on the bottom of the motor body; the other end is arranged on the top of the control box. The heat dissipation holes are arranged on the sidewall of the connection housing, which enlarge the heat dissipation area, the heat can be dissipate quickly and the heat dissipation effect is good.
2) The heat dissipation panels are arranged on a top surface of the control box. The step is arranged on an outer edge of each heat dissipation panel. The other end of the connection housing is disposed on the step. The plurality of heat dissipation panels is radially arranged. Outer ends of every two adjacent heat dissipation panels form an air inlet. The first air channel is formed between every two adjacent heat dissipation panels.
3) The rear end of the motor shaft stretches into the connection housing; centrifugal fan blades are arranged in the connection housing and installed at the rear end of the shaft; centrifugal fan blades are driven by the shaft to circulate the air and cool the motor quickly.
4) The gaps arranged at the top of one end of the connection housing are embedded into the mounting plate to enlarge the contacting area between the control box and the rear end cover to make the connection of the control box firm and not easy to shake.
5) The locking device comprises: the left clasp, and the right clasp. Both the two clasps comprise two ends. One end of the left clasp and one end of the right clasp are connected to the supporting plate; and the other end of left clasp and the other end of the right clasp are connected together by the screw bolt and the nut for fastening the top of the damping ring. The locking bracket is disposed between the left clasp and the right clasp. The locking bracket is connected with the left clasp and the right clasp via screw bolt and nut and is disposed on the top of the damping ring. Two sides of the motor are fastened into an organic whole through tension by the locking bracket, which keeps the mounting bracket from extension deformation in using.
6) The heat dissipation boss is arranged on the top of the control box. The IPM module is installed on the bottom surface of the circuit board. The IPM module is supported by the heat dissipation boss and is fastened by screws. The convex column is arranged on the top of the control box outside the circuit board. The power panel is arranged inside the control box beneath the circuit panel. The power panel is supported by the convex column, and is in electric connection with the circuit board via the lead terminal. Thus, the invention has a simple structure, reasonable arrangement, good heat dissipation effect, lowing the cost and simplified process.
7) The convex columns are arranged in the middle of the top surface of the control box outside the heat dissipation boss. The heat dissipation panels are arranged radially on the top surface of the control box outside the convex columns, thereby broadening the heat dissipation area. The heat dissipation panels and the centrifugal fan blades together efficiently dissipate the heat produced by IPM quickly, which brings good heat dissipation effect.
8) The rectifier bridge component and the SCR component are installed on the power panel. The rectifier bridge components and the SCR components are pressed against the inner surface of a sidewall of the control box by a plurality of press plates. The press plates are fastened to the control box by screws. The heat dissipation ribs are arranged outside the rectifier bridge components and the SCR components on the outer surface of the sidewall of the control box. The heat dissipation ribs stretch to the top surface of the control box. The heat of the components is dissipated quickly through the heat dissipation ribs, which bring good heat dissipation effect.
9) Outlet holes are arranged on the control box outside the control panel and power panel; the external circuits (the winding three-phase lead and the Hall position signal line) are led in through the wire hole; the structure has advantages of good design and simple installation procedures.
10) The ventilation holes are arranged on the sidewall of the control box, which contribute to circulate the air and dissipate heat.
11) The arch-shaped top surface of the control box contributes to dissipate heat.

BRIEF DESCRIPTION OF THE DRAWINGS

The invention is described hereinbelow with reference to the accompanying drawings, in which.

DETAILED DESCRIPTION OF THE EMBODIMENTS

Figure 1:
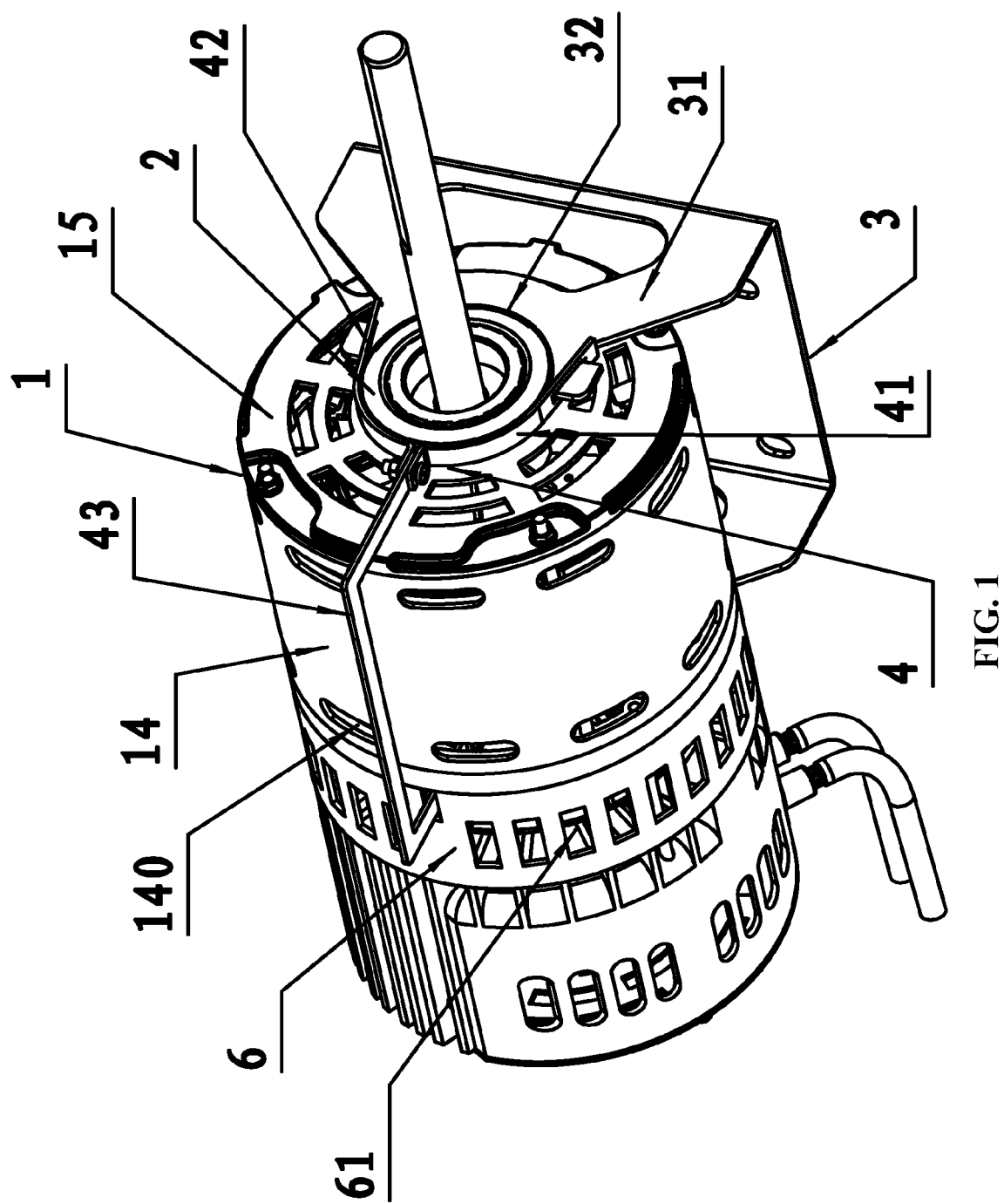
FIG. 1 is a stereogram of a motor in accordance with one embodiment of the invention.
Figure 2:
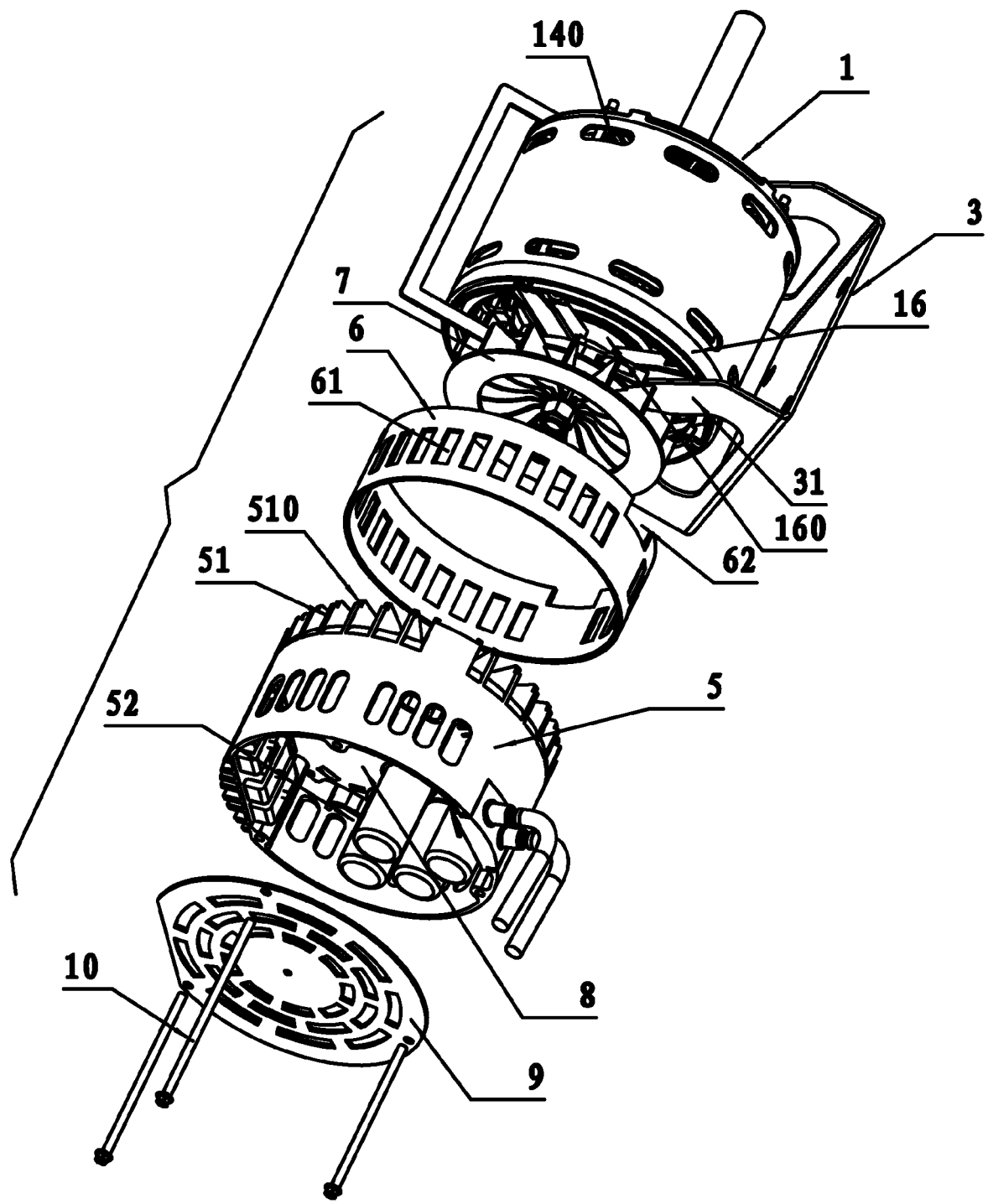
FIG. 2 is an exploded view of a motor in accordance with one embodiment of the invention.
Figure 3:
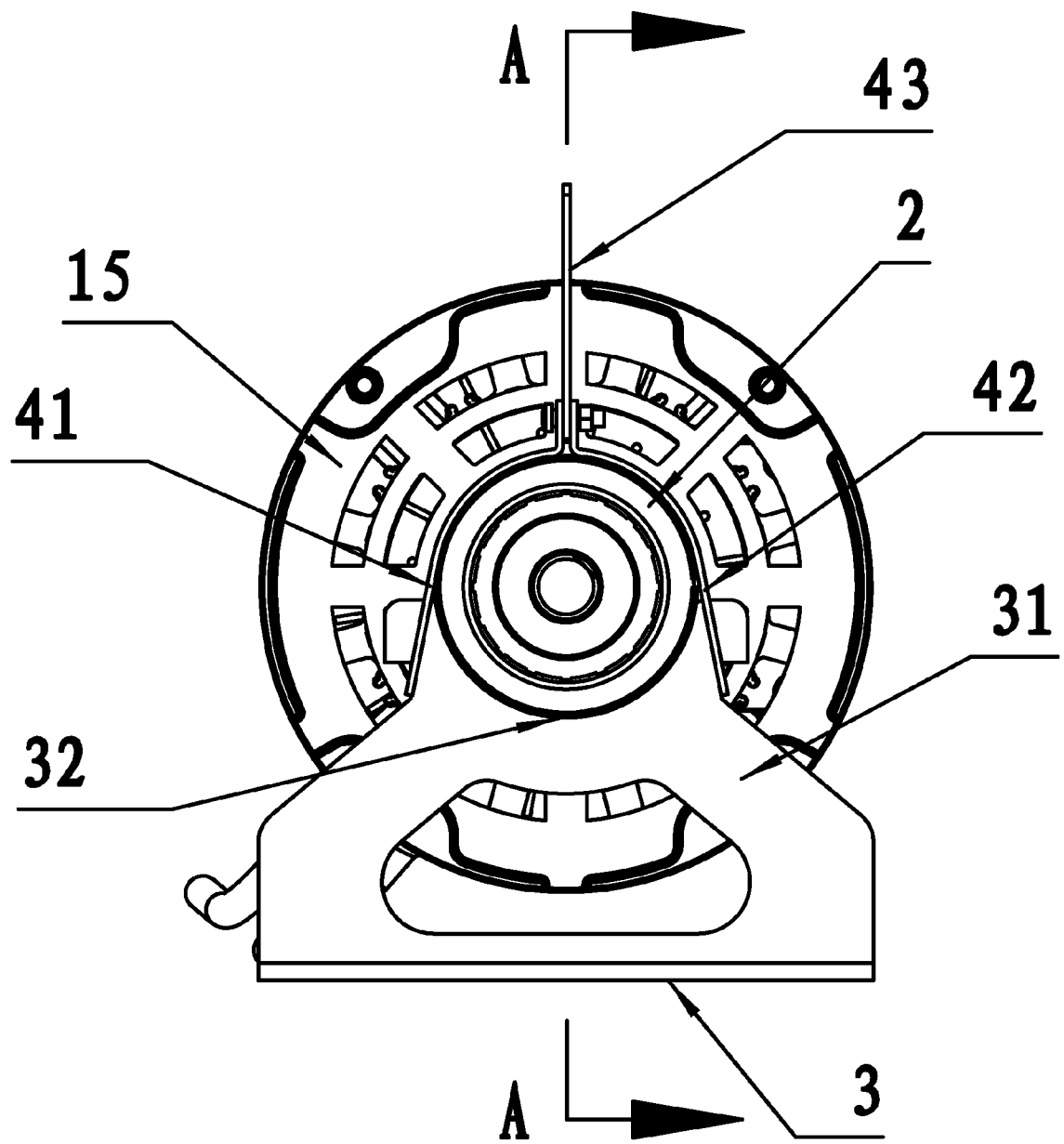
FIG. 3 is a structure diagram of a motor in accordance with one embodiment of the invention.

For further illustrating the invention, experiments detailing a high-power motor are described below. It should be noted that the following examples are intended to describe and not to limit the invention.

As shown in FIGS. 1-11, a high-power motor comprises: a motor body 1, a damping ring 2, a mounting bracket 3, a locking device 4, and a control box 5. The damping ring 2 is disposed on each end of the motor body 1. A bottom of the damping ring 2 is disposed on the mounting bracket 3. The damping ring 2 is fixed on the mounting bracket 3 by the locking device 4. The invention further comprises a connection housing 6. One end of the connection housing 6 is connected to a bottom of the motor body 1; and the other end of the connection housing 6 is connected to a top of the control box 5. A plurality of heat dissipation holes 61 is arranged on a side wall of the connection housing 6.

A plurality of heat dissipation panels 51 is arranged on a top surface of the control box 5. A step 510 is arranged on an outer edge of each heat dissipation panel 51. The other end of the connection housing 6 is disposed on the step 510.

A plurality of heat dissipation panels 51 is radially arranged. Outer ends of every two adjacent heat dissipation panels 51 form an air inlet 100. A first air channel 200 is formed between every two adjacent heat dissipation panels.

The motor body 1 comprises: a shaft 11, a rotor assembly 12, a stator assembly 13, a housing 14 provided with a plurality of ventilation holes 140, a front end cover 15, and a rear end cover 16 provided with a plurality of through-holes 160. The shaft 11 and the rotor assembly 12 are connected together. The rotor assembly 12 is disposed inside the stator assembly 13. The housing 14 and the stator assembly 13 are connected together. The front end cover 15 and the rear end cover 16 are disposed on two ends of the housing 14, respectively. The shaft 11 is supported by bearings the front end cover 15 and the rear end cover 16. A rear part of the shaft 11 stretches into the connection housing 6. A centrifugal fan blade 7 is positioned inside the connection housing 6 on the rear part of the shaft 11.

The connection housing 6 is disposed on a rear cover step 161 arranged on the rear end cover 16. The damping ring 2 arranged on the rear end cover 16 is positioned inside the connection housing 6.

An opening 52 is arranged on a bottom of the control box 5; the top of the control box 5 is sealed. A plurality of cone-shaped heat dissipation columns 53 is disposed on a middle part of the top surface of the control box 5 inside the heat dissipation panel 51. The circuit board 8 is disposed inside the control box 5. A box cover 9 is disposed at the bottom of the control box 5 for covering the opening 52.

The connection housing 6, the control box 5, and the box cover 9 are connected to the rear end cover 16 through screws 10.

Two sides of the mounting bracket 3 are convex upward to form two supporting plates 31, respectively. Each supporting plate 31 is provided with a recess 32. A bottom of the damping ring 2 is nested in the recess 32 of the mounting bracket 3.

A plurality of gaps 62 is arranged at a top of one end of the connection housing 6. The gaps 62 are imbedded in the support plate 31.

The locking device 4 comprises: a left clasp 41, and a right clasp 42. Both the two clasps comprise two ends. One end of the left clasp 41 and one end of the right clasp 42 are connected to the supporting plate 31; and the other end of left clasp 41 and the other end of the right clasp 42 are connected together by a screw bolt and a nut for fastening a top of the damping ring 2. A locking bracket 43 is disposed between the left clasp 41 and the right clasp 42. The locking bracket 43 is connected with the left clasp 41 and the right clasp 42 via the screw bolt and nut and is disposed on the top of the damping ring 2.

A heat dissipation boss 54 is arranged on the top of the control box 5. An IPM module 81 is installed on a bottom surface of the circuit board 8. The IPM module 81 is supported by the heat dissipation boss 54 and is fastened by screws. A convex column 55 is arranged on the top of the control box 5 outside the circuit board 8. A power panel 10 is arranged inside the control box 5 beneath the circuit panel 8. The power panel 10 is supported by the convex column 55, and is in electric connection with the circuit board 8 via a lead terminal.

A plurality of cone-shaped heat dissipation columns 53 is arranged on the middle of the top surface of the control box 5 inside the heat dissipation boss 54.

A rectifier bridge component 101 and an SCR component 102 are installed on the power panel 10. The rectifier bridge components 101 and the SCR components 102 are pressed against an inner surface of a sidewall of the control box 5 by a plurality of press plates 103. The press plates 103 are fastened to the control box 5 by screws.

A plurality of heat dissipation ribs 56 is arranged outside the rectifier bridge components 101 and the SCR components 102 on an outer surface of the sidewall of the control box 5. The heat dissipation ribs stretch to the top surface of the control box 5.

An outlet hole 57 is arranged outside the power panel 10 and the circuit board 8 on the control box 5.

A plurality of ventilation holes 58 is arranged on the sidewall of the control box 5.

The top surface of the control box 5 is an arc surface.

Figure 4:
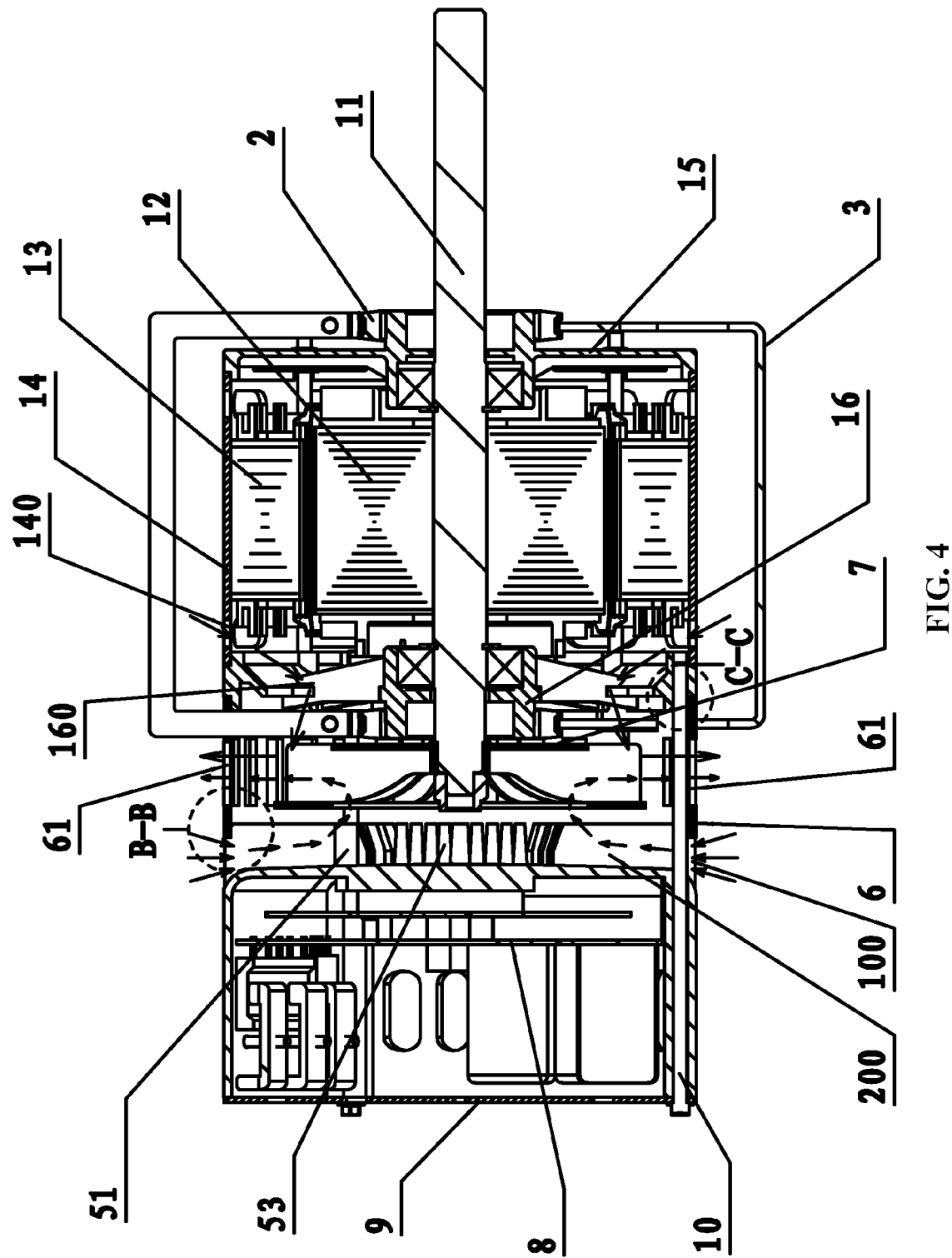
FIG. 4 is a cross sectional view taken from line A-A of FIG. 3.
Figure 5:
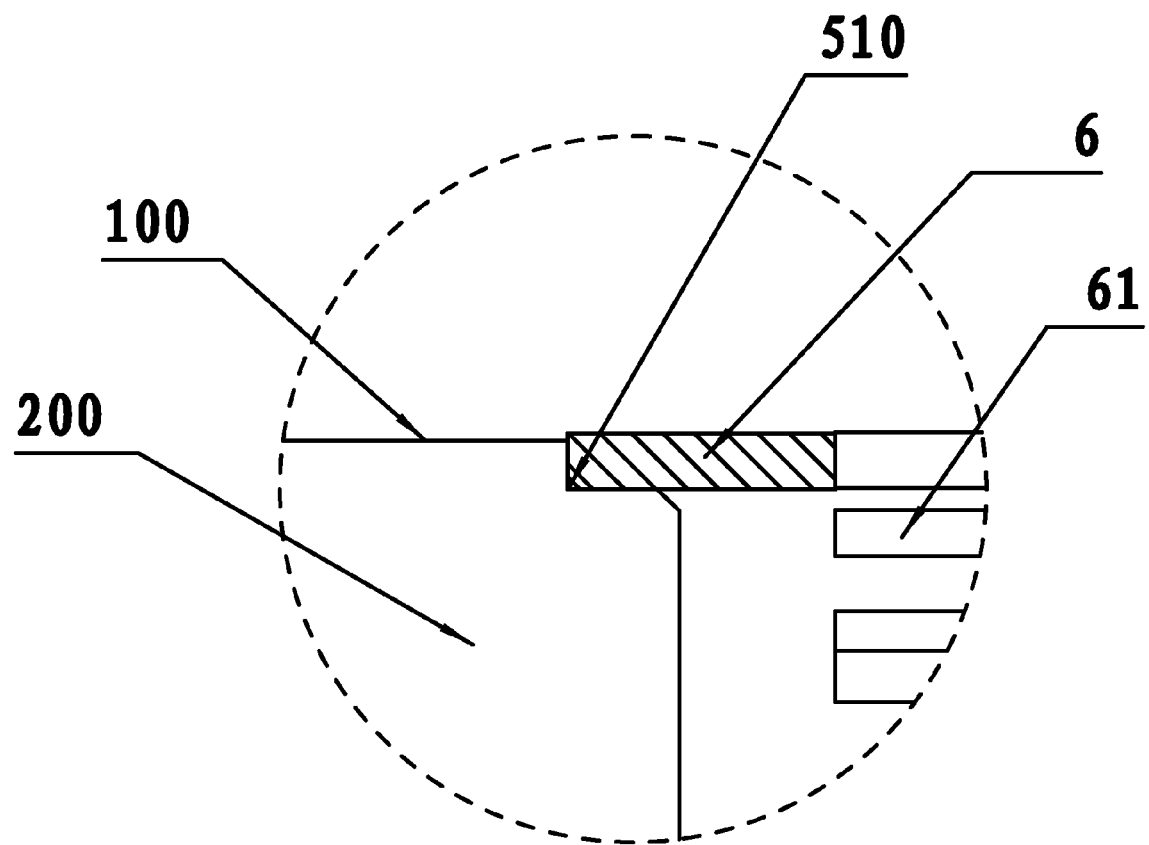
FIG. 5 is an enlarged view of part B-B of FIG. 4.
Figure 6:
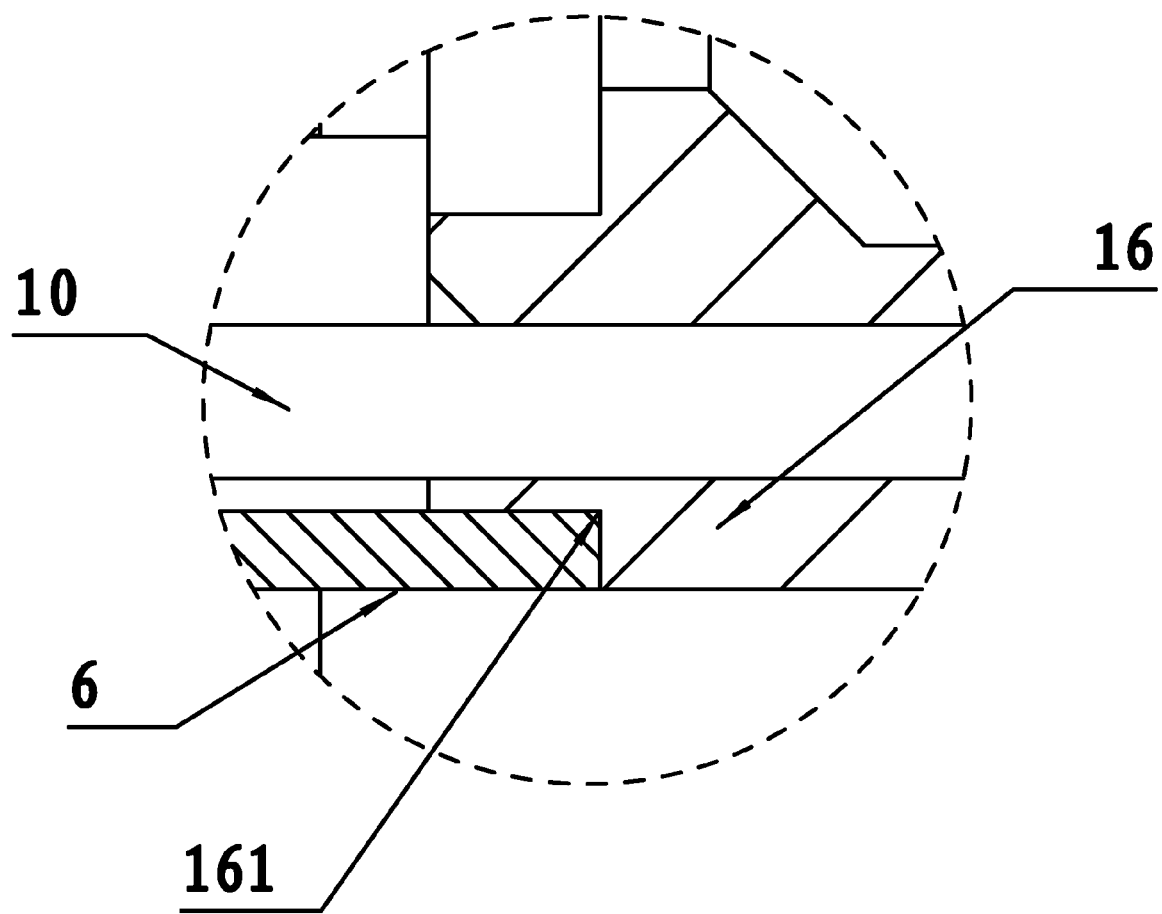
FIG. 6 is an enlarged view of part C-C of FIG. 4.
Figure 7:
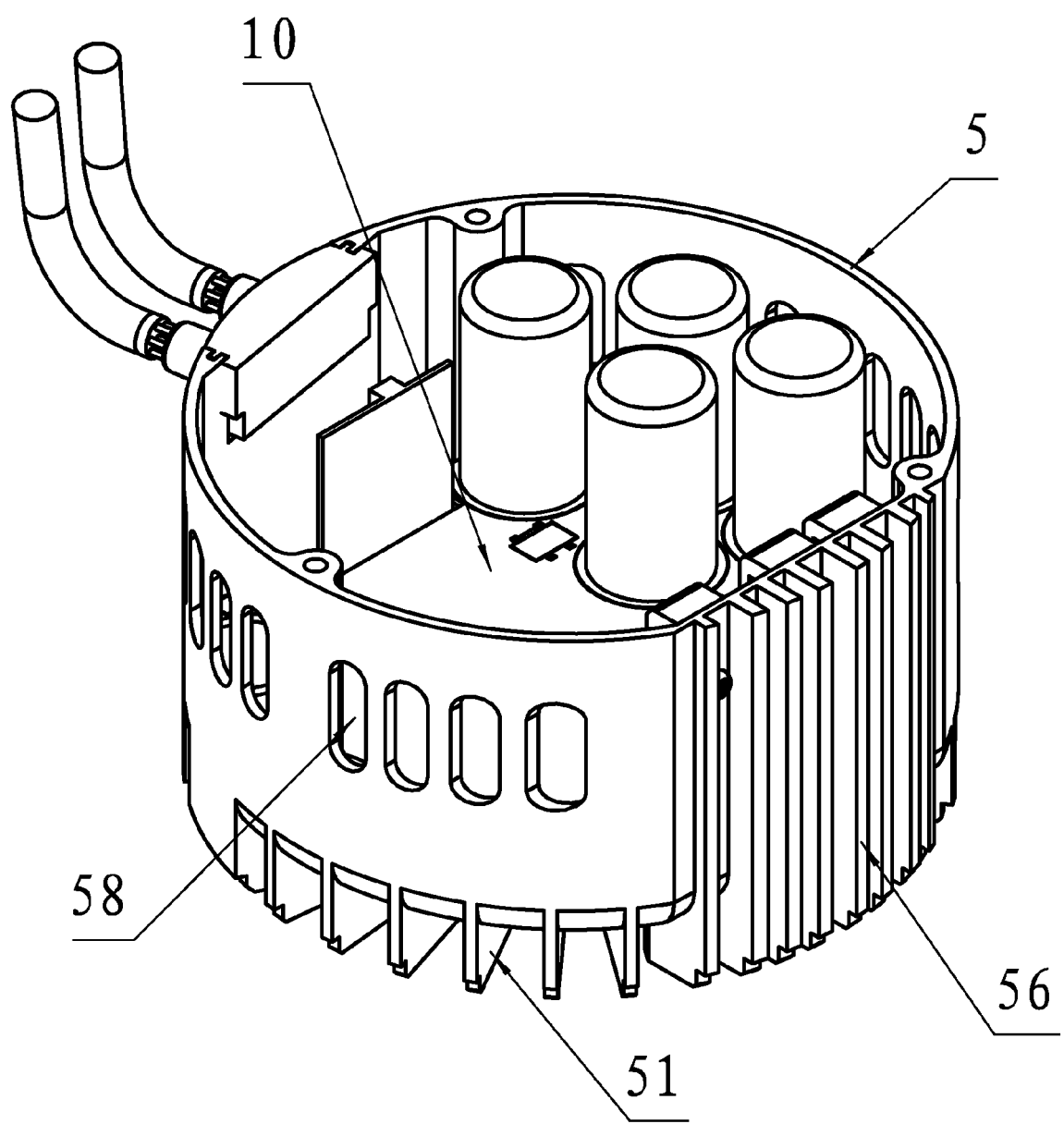
FIG. 7 is a stereogram of a control box in accordance with one embodiment of the invention.
Figure 8:
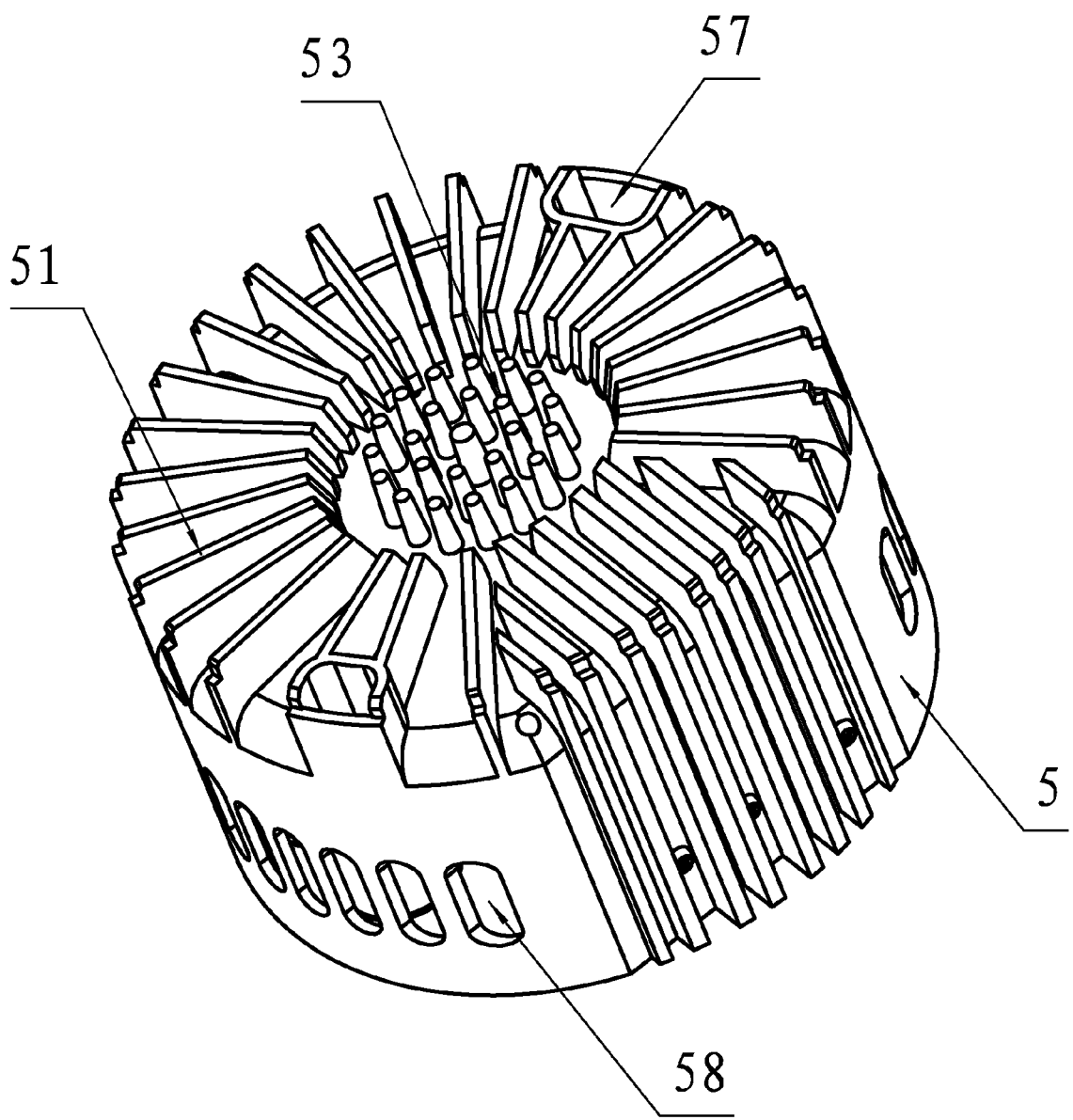
FIG. 8 is a stereogram of a control box from another angle in accordance with one embodiment of the invention.
Figure 9:
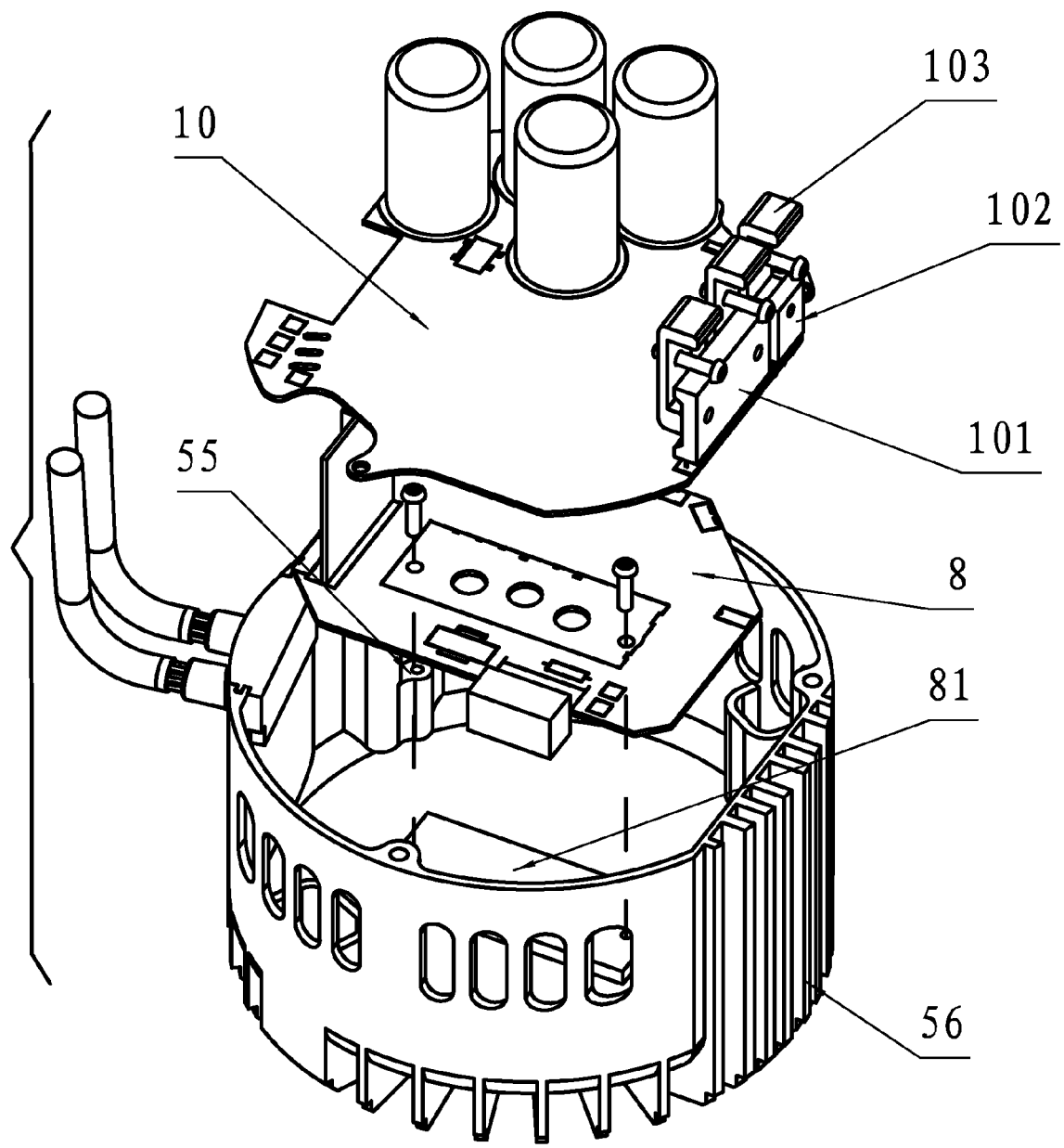
FIG. 9 is an exploded view of a control box in accordance with one embodiment of the invention.
Figure 10:
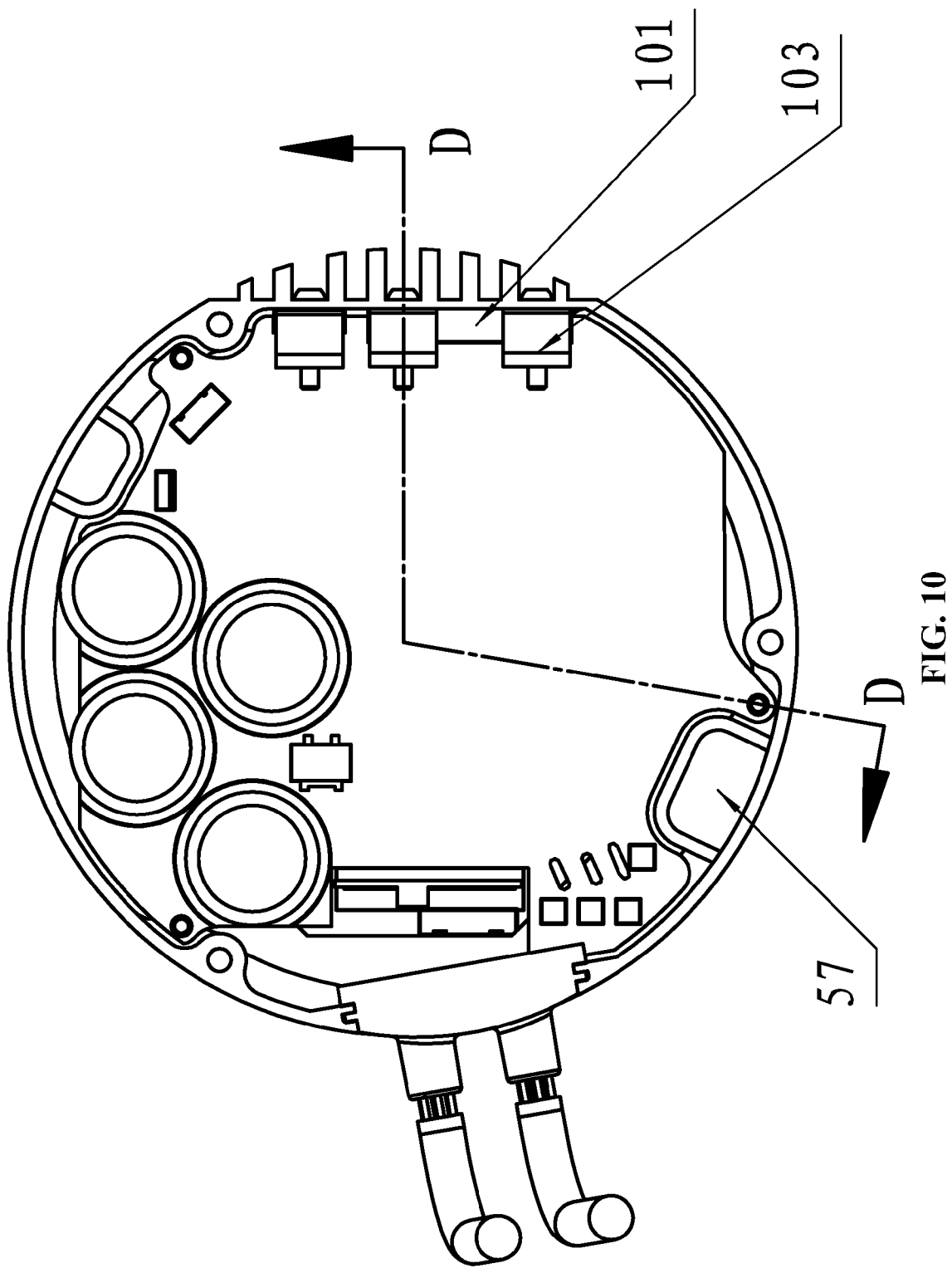
FIG. 10 is an top view of a control box in accordance with one embodiment of the invention.
Figure 11:
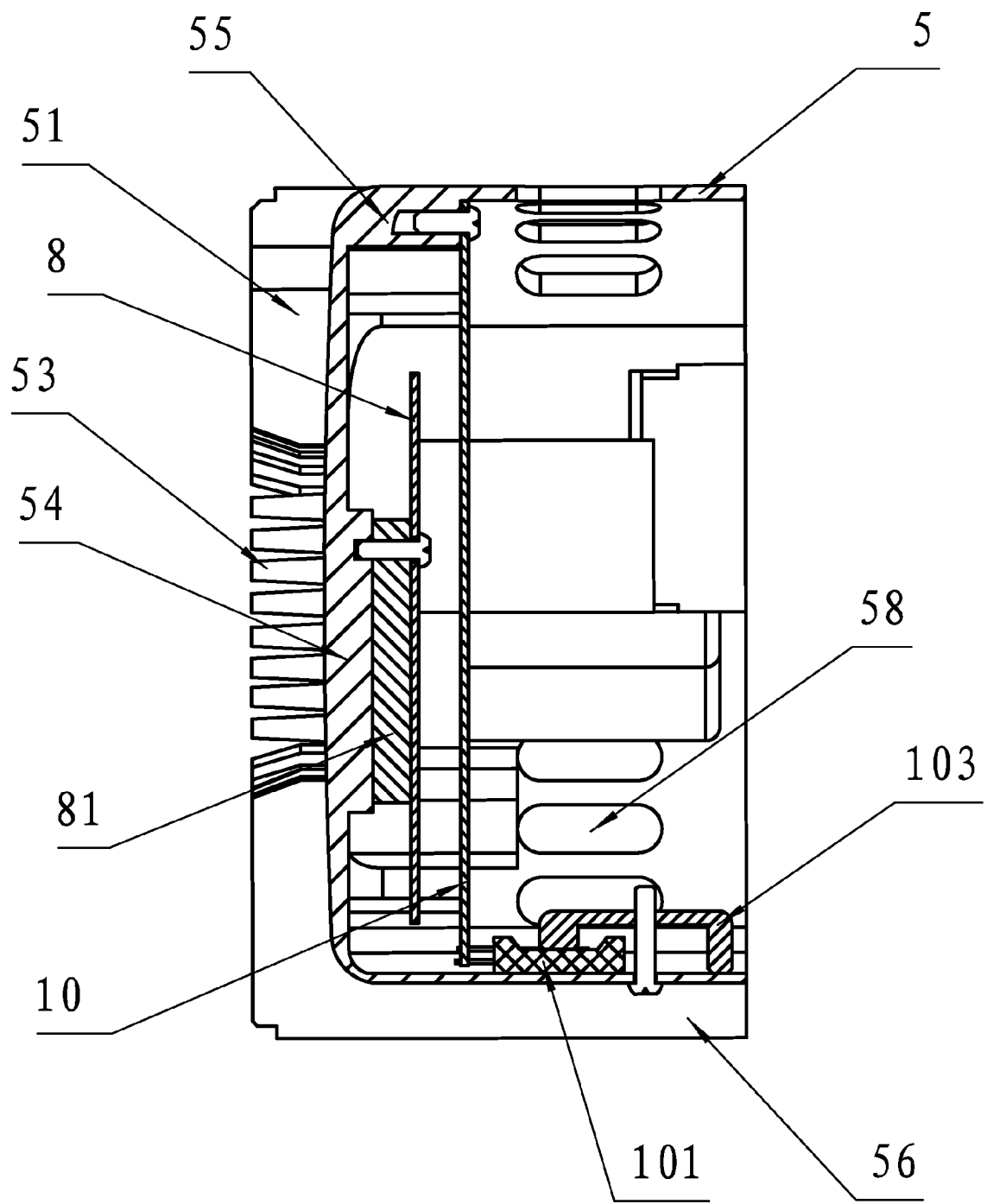
FIG. 11 is a cross sectional view taken from line D-D of FIG. 10.

As shown in FIG. 4, a direction of the air flow is represented by an arrow. The rear part of the shaft 11 stretches into the connection housing 6, the centrifugal fan blades 7 are positioned inside the connection housing 6 on the rear end of the shaft 11. When the motor runs, the shaft 11 drives the centrifugal fan blades 7 to rotate, and a first air flow enters through the air inlet 100, and flows out of the heat dissipation holes 61 through a first air channel 200. Meanwhile, a second air flow enters through the ventilation holes 140 of the housing 14, and passes through the through holes 160 of the rear end cover 16, and flows out of the heat dissipation holes 61. Thus, the effect of the heat dissipation is good.

Working principle of the invention: the connection housing 6 is added; one end of the connection housing 6 is arranged at the bottom of the motor body 1, and the other end of the connection housing 6 is arranged at the top of the control box 5. The heat dissipation holes 61 are arranged on the sidewall of the connection housing 6 to increase the heat dissipation area, so that the invention is advantageous in a fast heat dissipation and good heat dissipation effect.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:
1. A motor, comprising:
   a) a motor body, the motor body comprising two ends, a shaft, a rotor assembly, a stator assembly, a housing provided with a first plurality of ventilation holes, a front end cover, and a rear end cover provided with a plurality of through-holes;
   b) a damping ring, the damping ring comprising a bottom;
   c) a mounting bracket;
   d) a locking device;
   e) a control box; and
   f) a connection housing, the connection housing comprising a first end, a second end, and a sidewall;
wherein
   the damping ring is disposed on each end of the motor body;
   the bottom of the damping ring is supported by the mounting bracket;
   the damping ring is fixed on the mounting bracket by the locking device;
   the first end of the connection housing is connected to a bottom of the motor body;
   the second end of connection housing is connected to a top of the control box;
   a plurality of heat dissipation holes is arranged on the sidewall of the connection housing;
   a plurality of heat dissipation panels is arranged on a top surface of the control box;
   a step is arranged on an outer edge of each of the plurality of heat dissipation panels;
   the second end of the connection housing is disposed on the step;
   the plurality of heat dissipation panels is radially arranged;
   outer ends of every two adjacent heat dissipation panels form an air inlet;
   a first air channel is formed between every two adjacent heat dissipation panels;
   the shaft and the rotor assembly are connected together;
   the rotor assembly is disposed inside the stator assembly;
   the housing and the stator assembly are connected together;
   the front end cover and the rear end cover are disposed on two ends of the housing, respectively;
   the shaft is supported by bearings on the front end cover and the rear end cover;
   a rear part of the shaft stretches into the connection housing;
   a centrifugal fan blade is positioned inside the connection housing on the rear part of the shaft;
   an opening is arranged on a bottom of the control box;
   the top of the control box is sealed;
   a plurality of cone-shaped heat dissipation columns is disposed on a middle part of the top surface of the control box and is surrounded by the plurality of heat dissipation panels;
   a circuit board is disposed inside the control box;
   a box cover is disposed at the bottom of the control box for covering the opening;
   a heat dissipation boss is arranged on the top of the control box;
   an IPM module is installed on a bottom surface of the circuit board;
   the IPM module is supported by the heat dissipation boss and is fastened by screws;
   a convex column is arranged on the top of the control box outside the circuit board;
   a power panel is arranged inside the control box beneath the circuit panel; and
   the power panel is supported by the convex column and is in electric connection with the circuit board via a lead terminal.

2. The motor of claim 1, wherein the connection housing, the control box, and the box cover are connected to the rear end cover through screws.

3. The motor of claim 1, wherein
   a plurality of gaps is arranged at a top of the first end of the connection housing; and
   the plurality of gaps is imbedded in a support plate.

4. The motor of claim 1, wherein the plurality of cone-shaped heat dissipation columns is arranged inside the heat dissipation boss.

5. The motor of claim 1, wherein
   a rectifier bridge component and an SCR component are installed on the power panel;
   the rectifier bridge component and the SCR component are pressed against an inner surface of a sidewall of the control box by a plurality of press plates; and
   the press plates are fastened to the control box by screws.

6. The motor of claim 5, wherein
   a plurality of heat dissipation ribs is arranged outside the rectifier bridge component and the SCR component on an outer surface of the sidewall of the control box; and
   the heat dissipation ribs stretch to the top surface of the control box.

7. The motor of claim 5, wherein a second plurality of ventilation holes is arranged on the sidewall of the control box.

8. The motor of claim 5, wherein the top surface of the control box is an arc surface.

9. The motor of claim 6, wherein an outlet hole is arranged outside the power panel and the circuit board on the control box.

10. The motor of claim 9, wherein a second plurality of ventilation holes is arranged on the sidewall of the control box.

11. The motor of claim 9, wherein the top surface of the control box is an arc surface.

* * * * *